Nov. 12, 1957  C. F. PJERROU  2,812,584
ELONGATION INDICATING AND CONTROLLING MECHANISM
Filed Dec. 10, 1954

INVENTOR:
Charles F. Pjerrou
By Herbert E. Metcalf
His Patent Attorney ated Nov. 12, 1957

2,812,584

ELONGATION INDICATING AND CONTROLLING MECHANISM

Charles F. Pjerrou, Palos Verdes Estates, Calif., assignor to Northrop Aircraft, Inc., Hawthorne, Calif., a corporation of California Application December 10, 1954, Serial No. 474,510

2 Claims. (Cl. 33—148)

The instant invention relates to measuring devices and more particularly to measuring devices of the extensometer type adapted to measure, record, and limit the degree of elongation or compression occurring in a test specimen or work piece.

The measuring device disclosed herein may be utilized as an extensometer to measure the elongation occurring during the stressing of test specimens, it is, however, particularly useful in the forming of structural shapes which are fabricated by stretch forming methods.

Briefly the present device includes a body having movable and fixed elements each having pointed ends which contact the work piece at such time as the device is positioned on the work piece. The movable element includes an integral arm portion adapted to move over a scale located on the body of the device in response to elongations occurring in the work piece. Also pivotally mounted on the body of the device is an index member and pointer adapted to cooperate in a novel manner with the arm portion of the movable element. By presetting the index member and pointer certain physical characteristics, for example, the yield point and ultimate allowable elongation occurring in a work piece, will be apparent to an operator. The pointer under other conditions will indicate the greatest stress or elongation occurring in a work piece during a specific operation. The device also incorporates a micro switch mounted on the index member whereby forces acting on the work piece may be automatically controlled in accordance with elongations occurring in the work piece. The operation and additional advantages of the present measuring device will become more apparent as the disclosure progresses.

An object of the instant invention is to provide a device for accurately determining the degree of elongation or compression occurring in a test specimen or work piece.

Another object is to provide a device for automatically limiting the elongation or compression of a work piece when subjected to a predetermined stress and when utilized in connection with associated apparatus subjecting the work piece to the above mentioned stress.

Another object is to provide a device for visually indicating the yield point of a work piece.

Another object is to provide a device for visually indicating the percent of elongation or compression occurring in a work piece at any time during the stressing of the work piece.

Another object is to provide a device for indicating the greatest elongation or compression occurring in a work piece during a specific operation.

Another object is to provide a measuring device of the extensometer type which is easily attachable to and removable from a work piece, which is reliable and accurate in operation, and is economical to manufacture.

These and other objects will become more apparent from the following description and drawings in which like reference characters denote like parts throughout the several views. It is to be expressly understood, however, that the drawings are for the purpose of illustration only and not a definition of the limits of the invention, reference being had for this purpose to the appended claims.

Figure 1:
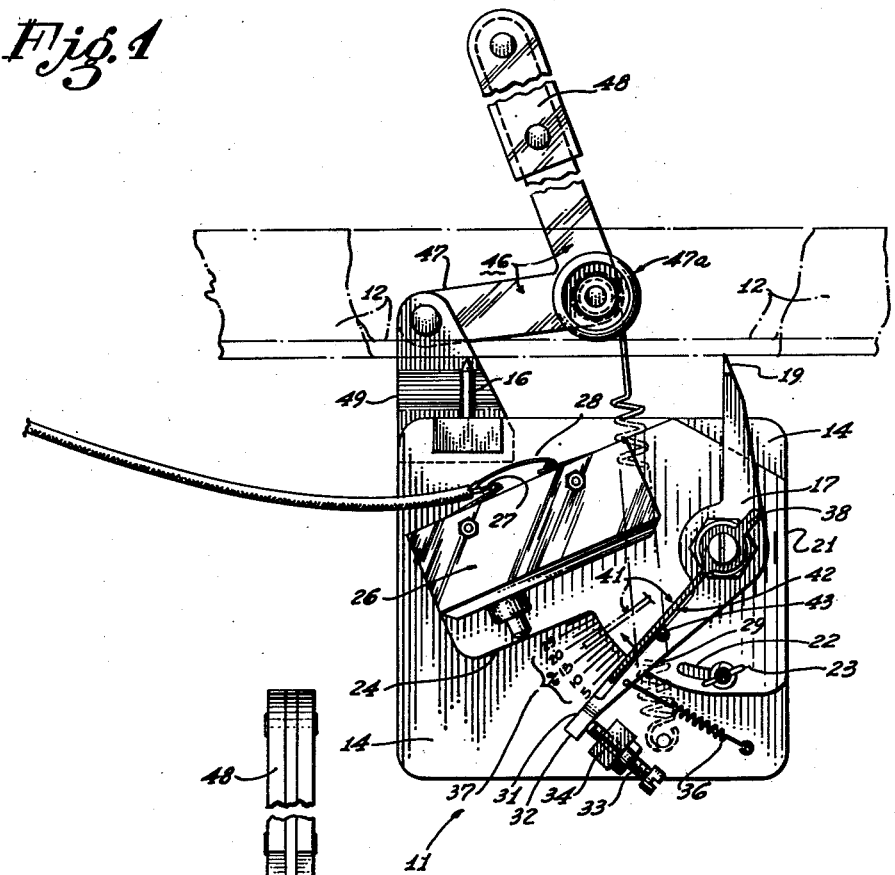
Figure 1 is a front elevational view of the measuring device.
Figure 2:
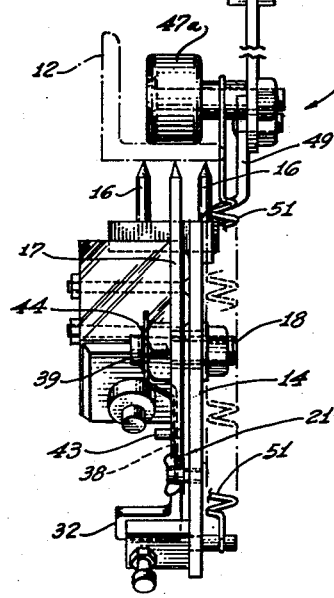
Figure 2 is a side view of Figure 1.

Referring to the figures a measuring device 11 of the extensometer type is shown in its initial position attached to a work piece or test specimen 12. The measuring device consists of a base plate 14 on which are mounted a pair of fixed elements 16 having conical pointed ends and a movable arm member 17. The arm member 17 is pivotally mounted on the plate 14 by means of a bolt 18 or the like and is provided with a pointed end 19. The pin elements 16 are positioned laterally on opposite sides, respectively, of the plate 14 and together with the pointed end of the arm 17 provide three points of contact between the specimen 12 and the measuring device.

An index member 21 generally of platelike configuration as shown in Figure 1, is located between the plate 14 and arm 17 and is also pivotally mounted on the bolt 18. The member 21 is provided with an arcuate slot 22 through which the shank of a thumb screw 23 passes to engage mating threads in the plate 14. Thus it is seen the index member may be pivoted about the axis of the bolt 18 through a predetermined range and may be releasably secured at any desired position within this range by the screw 23. A beveled edge portion 24 of the member 21 extends radially from the axis of the bolt 18 to function in a manner presently explained.

Mounted on the dial plate for movement therewith is a micro switch 26 having a trigger mechanism positioned in flush relationship with the edge 24. Electrical connectors 27 and 28 provide a path for current flow between electrical equipment (not shown), an electrical source (not shown), and the respective poles of the switch 26.

The movable arm 17 in the position as shown in Figure 1 constitutes the initial position thereof, that is the position which the arm is caused to assume prior to any elongation of work piece 12. A depending portion 29 of the movable arm is provided with a recessed edge portion 31 extending radially from the axis of the bolt 18. The angular movement of the arm 17 is limited in a clockwise direction, as viewed in Figure 1, by a projection 32 on the depending portion of the arm 17 contacting the trigger mechanism of the switch 26 and in a counter-clockwise direction by the projection 32 contacting a screw 33 mounted in a block 34 secured to the plate 14. Accordingly the arm 17 has an angular range limited by the screw 33 and the trigger mechanism of the switch 26. Normally the movable arm is maintained in its initial position, in which the projection 32 is in contact with the screw 33, by a helical tension spring 36 extending between the depending portion 29 and the plate 14.

A scale 37 having graduations extending radially from the axis of the bolt 18 is provided on the plate 14. The scale 37 is located on the plate 14 so that the edges 24 and 31 of the member 21 and arm 17, respectively, pass over the graduations of the scale in moving through their respective angular ranges. The scale 37 is calibrated so that the percent of elongation occurring in the work piece 12 may be read directly. In other words the elongation occurring in that portion of the work piece extending between the pins 16 and the pointed end 19 is indicated percentagewise with respect to the original length of the work piece extending between the pins 16 and pointed end 19.

A pointer 38 is mounted on the bolt 18 by means of a set screw 39 and is located in part in the recess in the edge 31 of the movable arm. One edge 41 of the pointer extends radially from the axes of the bolt 18 while the other edge 42 normally is in contact with a pin 43 mounted on the depending portion of the arm 17. With the pointer in contact with the pin 43 the edges 31 and 41 of the pointer and the movable arm, respectively, are located in a common plane also containing the axis of the bolt 18. A spring washer 44 is positioned between the pointer and the head of the bolt 18. The washer provides a frictional contact between the bolt and pointer whereby the relative relationship of the last mentioned elements remains unchanged until acted upon by an external force. Accordingly as the arm 17 moves in a clockwise direction the pointer will also be moved in a clockwise direction by the pin 43. As the arm 17 returns to its initial position the pointer 38, however, will retain its relationship with respect to the bolt 18 and scale 37. Thus it will be apparent that the pointer will indicate the greatest elongation occurring in a work piece during a specific operation although the arm 17 has returned to its initial position. A portion of the pointer extends from the bolt 18, at a position approximately diametrically opposite from the edges 41 and 42, to provide means whereby the pointer may be manually returned to its position in contact with the pin 43.

A lever arm 46 carries a roller 47a and provides means whereby the measuring device may be positioned on, removed from, or maintained in position on the work piece. The arm in the present embodiment consists of an end portion 47 and handle portion 48 extending generally at right angles to each other. The free end of the portion 47 is pivotally attached to an upstanding bracket 49 fixedly secured to the plate 14. The roller 47a is mounted on the arm 46 at the juncture of the handle and end portions. Accordingly the roller 47a may be moved into contacting relation with the side of the work piece opposite the pins 16 and pointed end 19. By means of the lever arm the points on the pins 16 and the pointed end 19 may be firmly seated in the work piece. The roller 47a is maintained in a position contacting the work piece by a helical spring 51 extending between the arm 46 and the plate 14. The measuring device may be removed from the work piece at such time as the arm 46 and roller 47a is moved in the direction away from the pins 16 and pointed end 19.

Although the measuring device has been shown and disclosed as having three contact points with the work piece it is apparent that one fixed pin 16 may be utilized instead of two. Also the pointed ends on the pins 16 and movable arm 17 may terminate in knife edges if desirable. Further the device as shown and described is adapted to measure elongations occurring in test specimens, however, it will be apparent that by a slight rearrangement of parts the device may also be utilized to measure compressions occurring in test speciments or the like.

It is apparent how the measuring device 11 may be utilized as a conventional extensometer and further explanation in this respect is not believed necessary. The measuring device, however, incorporates novel features which are particularly useful in the forming of structural shapes of the type used in airframe construction and its operation in this connection will be discussed.

The aforementioned structural shapes are usually fabricated from non-ferrous metals by conventional stretch forming methods. The instant measuring device, however, is not restricted in its use to non-ferrous metals but may also be used in the forming of shapes constructed of ferrous metals. In the stretch forming process forces which do not elongate the work piece are first applied thereto causing the piece to contour to a die of given configuration. Secondly forces of greater magnitude slightly exceeding the elastic limit or yield point of the work piece are applied. The latter application of forces causes the work piece to set so that it will retain the contour of the die after the forces are removed and the work piece removed from the die. In the above process it is extremely important that the elastic limit of the work piece should not be exceeded to any great extent or its usefulness as a structural member will be destroyed or at least greatly impaired.

The yield point of the work piece having been previously determined the measuring device 11 may be utilized to visually indicate that an elongation corresponding to the yield point has been reached or the device may be connected to automatically perform this function. For example, with the arm 17 in its initial position the pointer may be moved clockwise from the edge 31 an angular distance corresponding to the elongation at which the work piece will reach its yield point. The edge 24 of the index member is set a slight angular distance, in a clockwise direction, ahead of the edge 41 of the pointer. The measuring device is then positioned on the work piece as shown in Figure 1. As forces are applied to the work piece elongation thereof occurs causing the arm 17 to move angularly in a clockwise direction. At such time as the edge of the movable arm coincides with the edge 41 of the pointer the operator will know that the yield point of the work piece has been reached and forces acting thereon should be discontinued. If the operator inadvertently continues the elongation of the work piece, that is beyond the point as indicated by the pointer, the edge 24 will indicate the amount the work piece has been elongated past its yield point. In other words the angular distance remaining between the edge 24 and 31 will serve as an indication as to whether the work piece should be discarded or retained.

Similarly it may be desirous to elongate the work piece a predetermined amount after its yield point has been reached. Such a condition will be present at such time as the edge 31 and 41 of the arm 17 and pointer 38, respectively, reach or coincide with the edge 24 of the member 21. At such time as the edge 31 of the arm 17 reaches the edge 41 of the pointer 38 the operator will be put on notice that the yield point of the metal has been reached and the remainder of the operation should be continued with extreme care in order that the ultimate elongation of the work piece will not be exceeded.

It will be apparent that the pointer may also be utilized to indicate the maximum elongation occurring in the work piece during a specific operation. In achieving this result the pointer 38 is positioned in contact with the pin 43 at the beginning of an elongation operation. Should the machine applying forces to the work piece malfunction during the elongation operation, or for any other reason it becomes necessary to temporarily discontinue forces acting on the work piece, it is apparent the pointer will provide a record of the maximum elongation present in the work piece at the time the above forces were discontinued. With this information available the work piece may be readily subjected to the same stress at a later time.

In cases where an operator is located at considerable distance from the work piece the switch 26 may be utilized advantageously. For example the switch may be connected in series with an electric bulb (not shown). In this instance the edge 24 of the member 21 is adjusted to correspond to the desired elongation of a work piece. Accordingly as the edge 31 of the arm 17 reaches the edge 24 of the switch 26 will be actuated thereby illuminating the aforementioned bulb and signaling the operator that the yield point of the work piece has been reached. The switch 26 may also be connected in series with an electrically operated valve (not shown) controlling the flow of hydraulic fluid to the machine exerting forces on the work piece. Accordingly elongation of the work piece will be automatically discontinued by the actuation of the switch 26 at such time as the edge 31 of the arm 17 reaches the edge 24 of the member 21.

In either of the above cases the edge 24 may be placed in a position corresponding to the yield point of the work piece or ultimate elongation desired therein.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claims.

What is claimed is:

1. A device of the class described comprising: a body; first and second members mounted in spaced relation on said body and each having a pointed end; an index member; said second and index members being pivotally mounted on said body for relative angular movement thereon about a common axis; scale means on said body; said second and index members having respective straight edge portions which extend radially from said common axis to overlie said scale means in adjacent juxtaposed relation when said second and dial members are assembled on said body; said first member being fixedly secured to said body; adjustable means on said body for releasably securing said index member in a plurality of angular positions with respect to said body; a pointer mounted on said body for pivotal movement about said common axis; said pointer and second member having a first relative relationship in which an edge of said pointer coincides with the straight edge portion of said second member; means on said second member acting when the latter is moved in one angular direction to move said pointer an equal angular amount in the same direction and means on said body acting to maintain the relationship of said pointer and body in a fixed relationship at such time as said second member is moved in the opposite angular direction; and attaching means on said body which is cooperable with said pointed ends whereby said device may be attached to a work piece with said pointed ends seated on said work piece.

2. Apparatus as set forth in claim 1: including an electrical switch fixedly secured to said index member and being responsive to movements of said second member in that said switch is actuated between open and closed positions in accordance with predetermined angular positions of said second member.

References Cited in the file of this patent

UNITED STATES PATENTS

| 535,224 | Schopper | Mar. 5, 1895 |
| 1,133,300 | McGauley | Mar. 30, 1915 |
| 1,723,390 | Tingley | Aug. 6, 1929 |

FOREIGN PATENTS

| 289,203 | Great Britain | Apr. 26, 1928 |
| 684,213 | France | Oct. 30, 1929 |